United States Patent
Batra et al.

(10) Patent No.: US 10,333,770 B2
(45) Date of Patent: Jun. 25, 2019

(54) PRIORITIZING CONNECTIVITY FAULT MANAGEMENT CONDITIONING ACTIONS IN ETHERNET NETWORKS

(71) Applicant: Ciena Corporation, Hanover, MD (US)

(72) Inventors: Mohit Batra, Delhi (IN); Mukesh Chhabra, New Delhi (IN); Abhishek Sethi, Gurgaon (IN); Rajeev Pahuja, New Delhi (IN)

(73) Assignee: Ciena Corporation, Hanover, MD (US)

( * ) Notice: Subject to any disclaimer, the term of this patent is extended or adjusted under 35 U.S.C. 154(b) by 147 days.

(21) Appl. No.: 15/617,489

(22) Filed: Jun. 8, 2017

(65) Prior Publication Data

US 2018/0309615 A1  Oct. 25, 2018

(30) Foreign Application Priority Data

Apr. 25, 2017 (IN) .............................. 201711014603

(51) Int. Cl.
*H04L 12/24* (2006.01)
*H04L 12/26* (2006.01)

(52) U.S. Cl.
CPC ........ *H04L 41/0609* (2013.01); *H04L 43/062* (2013.01); *H04L 43/0811* (2013.01)

(58) Field of Classification Search
None
See application file for complete search history.

(56) References Cited

U.S. PATENT DOCUMENTS

2013/0114394 A1* 5/2013 Hu ...................... H04L 41/0816
370/216

OTHER PUBLICATIONS

G.8013/Y.1731 Telecommunication Standardization Sector of ITU, Aug. 2015 (Year: 2015).*

* cited by examiner

*Primary Examiner* — Alex Skripnikov
(74) *Attorney, Agent, or Firm* — Clements Bernard Walker PLLC; Christopher L. Bernard; Lawrence A. Baratta, Jr.

(57) ABSTRACT

Systems and methods for prioritizing Connectivity Fault Management conditioning actions in a node in an Ethernet network include transmitting a configured priority of a Maintenance End Point (MEP) associated with the node to other nodes in the Ethernet network; receiving a fault notification from a remote MEP with a received priority configured at the remote MEP; and performing an action based on a comparison between the configured priority and the received priority at the node.

20 Claims, 12 Drawing Sheets

US 10,333,770 B2

PRIORITIZING CONNECTIVITY FAULT MANAGEMENT CONDITIONING ACTIONS IN ETHERNET NETWORKS

FIELD OF THE DISCLOSURE

The present disclosure generally relates to packet networking systems and methods. More particularly, the present disclosure relates to prioritizing Connectivity Fault Management (CFM) conditioning actions in Ethernet networks.

BACKGROUND OF THE DISCLOSURE

Connectivity Fault Management (CFM) is defined, for example, in IEEE 802.1ag "IEEE Standard for Local and Metropolitan Area Networks Virtual Bridged Local Area Networks Amendment 5: Connectivity Fault Management." CFM defines protocols and practices for Operations, Administration, and Maintenance (OAM) for paths through 802.1 bridges and local area networks (LANs). Disadvantageously, IEEE 802.1ag does not describe any procedure to follow in case a single Maintenance End Point (MEP) associated with 'n' MEP ('n' is an integer or some other identifier of the MEP) in the same Maintenance Association (MA) reports a fault. Consequently, conventional systems suffer from a "by default" worst case behavior in which all MEP's start reporting faults simultaneously thereby causing unwanted conditions or alarm reporting actions.

BRIEF SUMMARY OF THE DISCLOSURE

In an exemplary embodiment, a method of prioritizing Connectivity Fault Management (CFM) conditioning actions in a node in an Ethernet network includes transmitting a configured priority of a Maintenance End Point (MEP) associated with the node to other nodes in the Ethernet network; receiving a fault notification from a remote MEP with a received priority configured at the remote MEP; and performing an action based on a comparison between the configured priority and the received priority at the node. The method can further include receiving the configured priority from the remote MEP and tracking configured priorities for all remote MEPs. The method can further include, responsive to a change in the configured priority, transmitting the changed configured priority by the MEP associated with the node to other nodes in the Ethernet network. The configured priority can be zero during service turn up by the node, and wherein the configured priority is updated by an administrator and the transmitting occurs subsequent to the configured priority being updated. The transmitting the configured priority can be via a Type-Length-Value (TLV) in a Continuity Check Message (CCM).

The performing can include, responsive to the received priority being higher than the configured priority in a fault reporting message, raising a fault associated with the fault notification against a service associated with the MEP; and, responsive to the received priority in a fault reporting message being less than or equal to the configured priority, ignoring the fault against the service. The Ethernet network can include an Ethernet Local Area Network (ELAN) topology which is multi-point to multi-point. The Ethernet network can include an Ethernet Tree (ETREE) topology which is point to multi-point with a head node including an MEP with a highest priority. The Ethernet network can include at least two remote MEPs, each with a different configured priority, and wherein the Ethernet network utilizes CFM between the node and the at least two remote MEPs. The Ethernet network can include at least one remote MEP in a point-to-point topology, each of the node and the at least one remote MEP with a different configured priority, and wherein the Ethernet network utilizes CFM between the node and the at least one remote MEP.

In another exemplary embodiment, an apparatus configured to prioritize Connectivity Fault Management (CFM) conditioning actions at a node in an Ethernet network includes circuitry configured to transmit a configured priority of a Maintenance End Point (MEP) associated with the node to other nodes in the Ethernet network; circuitry configured to receive a fault notification from a remote MEP with a received priority; and circuitry configured to perform an action based on a comparison between the configured priority and the received priority at the node. The apparatus can further include circuitry configured to receive the received priority from the remote MEP and track configured priorities for all remote MEPs. The configured priority can be transmitted via a Type-Length-Value (TLV) in a Continuity Check Message (CCM).

The circuitry configured to perform can be configured to, responsive to the received priority being higher than the configured priority, raise a fault associated with the fault notification against a service associated with the MEP; and, responsive to the received priority being less than or equal to the configured priority, ignore the fault against the service. The Ethernet network can include an Ethernet Local Area Network (ELAN) topology which is multi-point to multi-point. The Ethernet network can include an Ethernet Tree (ETREE) topology which is a point to multi-point with a head node including an MEP with a highest priority. The Ethernet network can include at least two remote MEPs, each with a different configured priority, and wherein the Ethernet network utilizes CFM between the node and the at least two remote MEPs. The Ethernet network can include at least one remote MEP in a point-to-point topology, each of the node and the at least one remote MEP with a different configured priority, and wherein the Ethernet network utilizes CFM between the node and the at least one remote MEP.

In a further exemplary embodiment, a node in an Ethernet network configured to prioritize Connectivity Fault Management (CFM) conditioning actions includes one or more ports; and a controller communicatively coupled to the one or more ports and configured to transmit a configured priority of a Maintenance End Point (MEP) associated with the node to other nodes in the Ethernet network, receive a fault notification from a remote MEP with a received priority, and perform an action based on a comparison between the configured priority and the received priority at the node. The controller can be further configured to receive the received priority from the remote MEP and track configured priorities for all remote MEPs.

BRIEF DESCRIPTION OF THE DRAWINGS

The present proposed solution is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to prioritizing Connectivity Fault Management (CFM) conditioning actions in Ethernet networks. Again, IEEE 802.1ag does not describe any procedure in case a single MEP associated with 'n' MEP in same MA reports a fault. Consequently, systems suffer from a "by default" worst case behavior in which all MEP's start reporting faults simultaneously thereby causing unwanted conditions or alarm reporting actions. To address this "by default" worst case behavior, the systems and methods described herein provide prioritizing of fault decisions on an MEP. Specifically, each MEP in an MA that participates in "Remote-MEP" learning is assigned a configured priority (e.g., user configured, default, etc.) The configured priority of a service endpoint is transmitted as a reserved Type-Length-Value (TLV) in Continuity Check Messages (CCMs) and can be maintained as part of a remote MEP database by all other service endpoints. On receiving a fault notification from a service endpoint, the configured priority from an incoming CCM frame is compared against user configured priority of that maintenance endpoint on that node. When the received priority is higher than the configured priority, the incoming CCM fault is honored and raised against the service. When the received priority is lower or equal than the configured priority, the incoming fault is ignored. Advantageously, the systems and methods proposed herein reduce service outages as well as extend Virtual Link Loss Indication (VLLI) to CFM over Ethernet Local Area Network (ELAN).

Deployment Example

Figure 1:
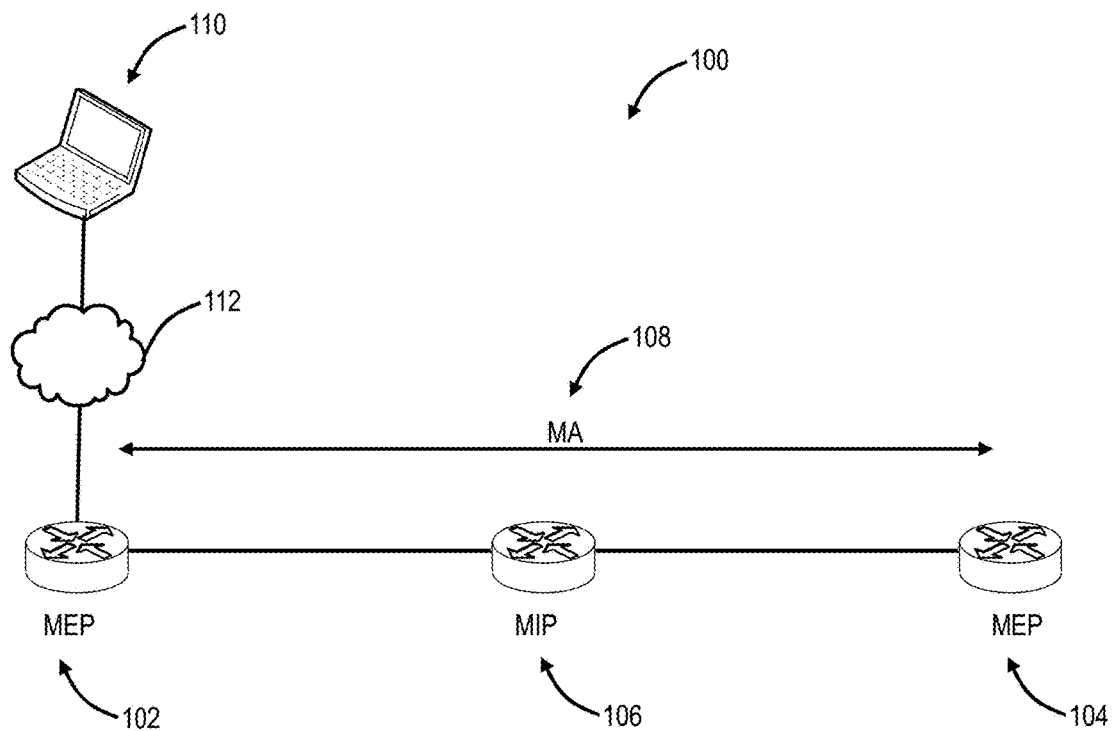
FIG. 1 is a network diagram of an Ethernet network configured with Ethernet OAM mechanisms.

Referring to FIG. 1, in an embodiment of the proposed solution, a network diagram illustrates a generic Ethernet network 100 configured with Ethernet OAM mechanisms. For illustration purposes, the Ethernet network 100 includes three interconnected network elements 102, 104, 106. The network 100 includes Ethernet OAM mechanisms such as IEEE 802.1ag CFM, Y.1731, etc. Fundamental to CFM is the concept of a Maintenance Entity Group (MEG) or a Maintenance Association (MA), which is the identified network transport construct spanning the various network nodes underlying a given service or set of services. CFM relies on well-defined messages exchanged between the network elements, specifically and in particular each Maintenance End Point (MEP) that provides origination and termination of the service transport path(s) for an MA. The network elements 102, 104 are defined as a MEPs. In CFM, an MEP is configured to source and sink CFM/OAM frames, i.e. source and sink within a single configured MD (Maintenance Domain), pass-thru if MD Level is higher than the configured level for the MEP, and discarded if MD Level is lower. The MEPs 102, 104 are also configured to participate in performance monitoring (OAM measurements) such as CCMs, Loss Measurement, Delay Measurement, etc. In a point-to-point network, there are two MEP nodes at the endpoints. In other configurations, there may be multiple MEP nodes. Other topologies are also contemplated. Also, a CFM domain having one or more Maintenance Intermediate Point (MIP) nodes that may be bounded by a plurality of MEP nodes. In order that CFM frame flows are appropriately filtered so that they are processed only by the intended domain's nodes, the MEP/MIP population of an Ethernet CFM network is configured appropriately.

The network element 106 is defined as a MIP which resides between MEPs, i.e., the MIP 106 is communicatively coupled between the MEPs 102, 104. A MIP is configured to process and forward CFM frames but does not initiate CFM frames. As described herein, MEP and MIP terminology is used for nodes present at endpoints and intermediate points, respectively, in the Ethernet network 100. Also, Ethernet Path terminology is used to denote a point-to-point Ethernet connection between two nodes, e.g., the connection being built using Virtual Local Area Network (VLAN) cross connection or unicast Ethernet Media Access Control (MAC) plus VLAN connection. Additionally, other types of Ethernet paths, such as, for example, Provider Backbone Bridging-Traffic Engineering (PBB-TE), Multiprotocol Label Switching Transport Profile (MPLS-TP), and the like are also contemplated by the systems and methods described herein.

The systems and methods proposed herein contemplate implementation and operation on Ethernet networks such as those compliant to IEEE 802.1ag-2007, G.8013/Y.1731, and/or Metro Ethernet Forum (MEF) specifications. Of note, IEEE 802.1ag-2007 and G.8013/Y.1731 both relate to and define CFM for Ethernet OAM. Various terminology utilized herein, such as MEP, MIP, CCM, Protocol Data Unit (PDU), etc. is common to each of IEEE 802.1ag-2007, G.8013/Y.1731, MEF, etc. IEEE 802.1ag-2007 utilizes the term Maintenance Association (MA) whereas G.8013/Y.1731 utilizes Maintenance Entity Group (MEG) for the same construct. Those of ordinary skill in the art will recognize while described herein as the MA 108; the MA 108 could also be referred to as the MEG 108. Generally, the MA 108 and MEG relate to an administrative grouping relative to the MEPs 102, 104. Additionally, IEEE 802.1ag-2007 defines an MEP as a Maintenance association End Point whereas G.8013/Y.1731 and MEF define an MEP as a Maintenance Entity Group End Point. In the following description, MEP may generally be referred to as a Maintenance End Point covering both the constructs of IEEE 802.1ag-2007, G.8013/Y.1731, MEF.

The network elements 102, 104, 106 are configured in an MA 108 which enables a grouping of nodes in a maintenance group for OAM to be grouped on different spans. The MEG 108 (or the MA 108) is a set of MEPs, each configured with a same unique MEG ID code (UMC) and MEG Level or Maintenance Association Identifier (MAID) and Maintenance Domain (MD) level. The MA 108 may be thought of as a full mesh of Maintenance Entities (MEs), the MEs including MEPs, MIPs, etc., with a set of MEPs configured therebetween. The UMC is a unique identifier for the MA 108 domain. Additionally, the MA 108 allows for nesting of various groups. The MA Level and the MD is a management space on a network, typically owned and operated by a single entity. MA Levels and MDs may be configured with names and levels, where eight levels range from 0 to 7. A hierarchal relationship exists between domains based on the levels. The larger the domain, the higher the level value. In case MAs are nested, the OAM flow of each MA has to be clearly identifiable and separable from the OAM flows of the other MAs. In case the OAM flows are not distinguishable by the ETH layer encapsulation itself, the MA Level in the OAM frame distinguishes between the OAM flows of nested MAs. Eight MA Levels are available to accommodate different network deployment scenarios. As described herein, the various systems and methods may be applied to per-node MEPs, per-interface MEPs, or per-port MEPs. Specifically, a per-node MEP applies to an entire network element whereas per-interface and per-port MEPs are for a single provisioned service on the network element.

The network 100 also includes a management system 110 communicatively coupled to the network elements 102, 104, 106 through a data communications network 112. The management system 110 can be a Network Management System (NMS), an Element Management System (EMS), a craft interface, etc. In some embodiments of the proposed solution, the management system 110 is configured to provide OAM access to the network 100 as well as provisioning of services and the like. As described herein, the network 100 can use a staggering technique to scale OAM sessions supported on the network elements 102, 104, 106.

The primary purpose for IEEE 802.1ag Connectivity Fault Management-CFM is to monitor end-to-end per-service-instance proactively. The per-service-instance in an Ethernet network is a Service VLAN (known as the MA 108). CFM identifies service endpoints using the MEP ID's and does a discovery of these service endpoints using unique ID's referred to RMEP ID's "Remote-End Points."

Network Element

Figure 2:
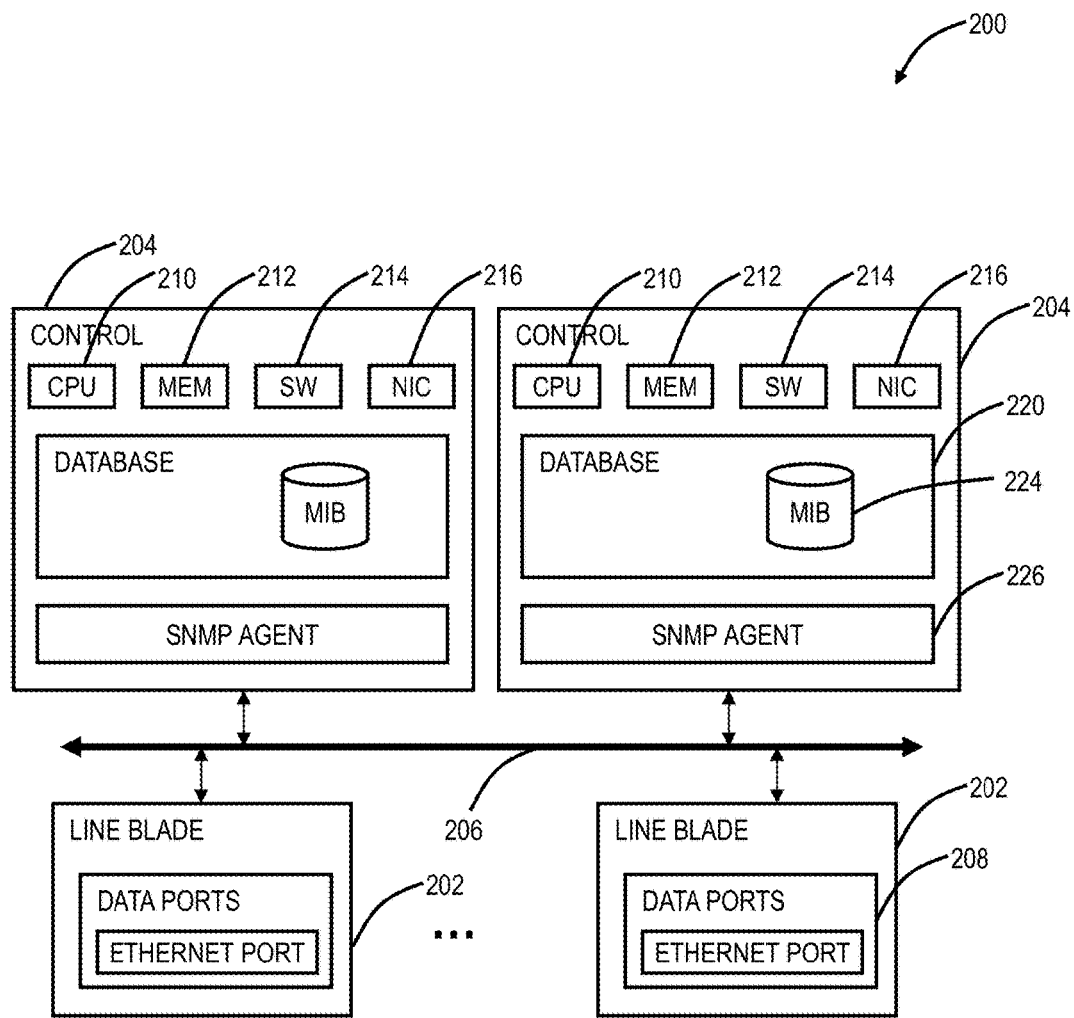
FIG. 2 is a block diagram of an implementation of a network element such as for the MEP and/or the Maintenance Intermedia Point (MIP) in the network of FIG. 1.

Referring to FIG. 2, in an embodiment of the proposed solution, a block diagram illustrates an implementation of a network element 200 such as for the MEP 102, 104 and/or the MIP 106 in the network 100. In this embodiment, the network element 200 is an Ethernet network switch for illustration purposes, but those of ordinary skill in the art will recognize the systems and methods described herein contemplate other types of network elements and other implementations. In this embodiment, the network element 200 includes a plurality of blades 202, 204 interconnected via an interface 206. The blades 202, 204 are also known as line cards, line modules, circuit packs, pluggable modules, etc. and generally refer to components mounted within a chassis, shelf, etc. of a data switching device, i.e. the network element 200. Each of the blades 202, 204 may include numerous electronic devices and/or optical devices mounted on a circuit board along with various interconnects including interfaces to the chassis, shelf, etc. Two exemplary blades are illustrated with line blades 202 and control blades 204. The line blades 202 generally include data ports 208 such as a plurality of Ethernet ports. For example, each line blade 202 may include a plurality of physical ports (208) disposed on an exterior of the blade 202 for receiving ingress/egress connections. Additionally, the line blades 202 may include switching components to form a switching fabric via the interface 206 between all of the data ports 208 allowing data traffic to be switched between the data ports 208 on the various line blades 202. The switching fabric is a combination of hardware, software, firmware, etc. that moves data coming into the network element 200 out by the correct port 208 to the next network element. In general, the switching fabric may include switching units, or individual boxes, in a node; integrated circuits contained in the switching units; and programming (coded logic) that allows switching paths to be controlled.

The control blades 204 include a microprocessor 210, memory 212, software (coded logic) 214, and a network interface 216. Specifically, the microprocessor 210, the memory 212, and the software 214 may collectively control, configure, provision, monitor, etc. the network element 200. The network interface 216 may be utilized to communicate with a management system such as a Network Management System (NMS), Element Management System (EMS), and the like (110). Additionally, the control blades 204 may include a database 220 that tracks and maintains provisioning, configuration, operational data and the like. The database 220 may include a management information base (MIB) 222 which may include CFM objects. Further, the control blades 204 may include a Simple Network Management Protocol (SNMP) Agent 226 configured to operate SNMPv2, SNMPv3, etc. or some other network management communication protocol. In this embodiment, the network element 200 includes two control blades 204 which may operate in a redundant or protected configuration such as 1:1, 1+1, etc. In general, the control blades 204 maintain dynamic system information including Layer 2 forwarding databases, protocol state machines, and the operational status of the ports 208 within the network element 200. Additionally, the control blades 204 may be configured to provide CFM as described herein.

CFM Over ELAN

Figure 3:
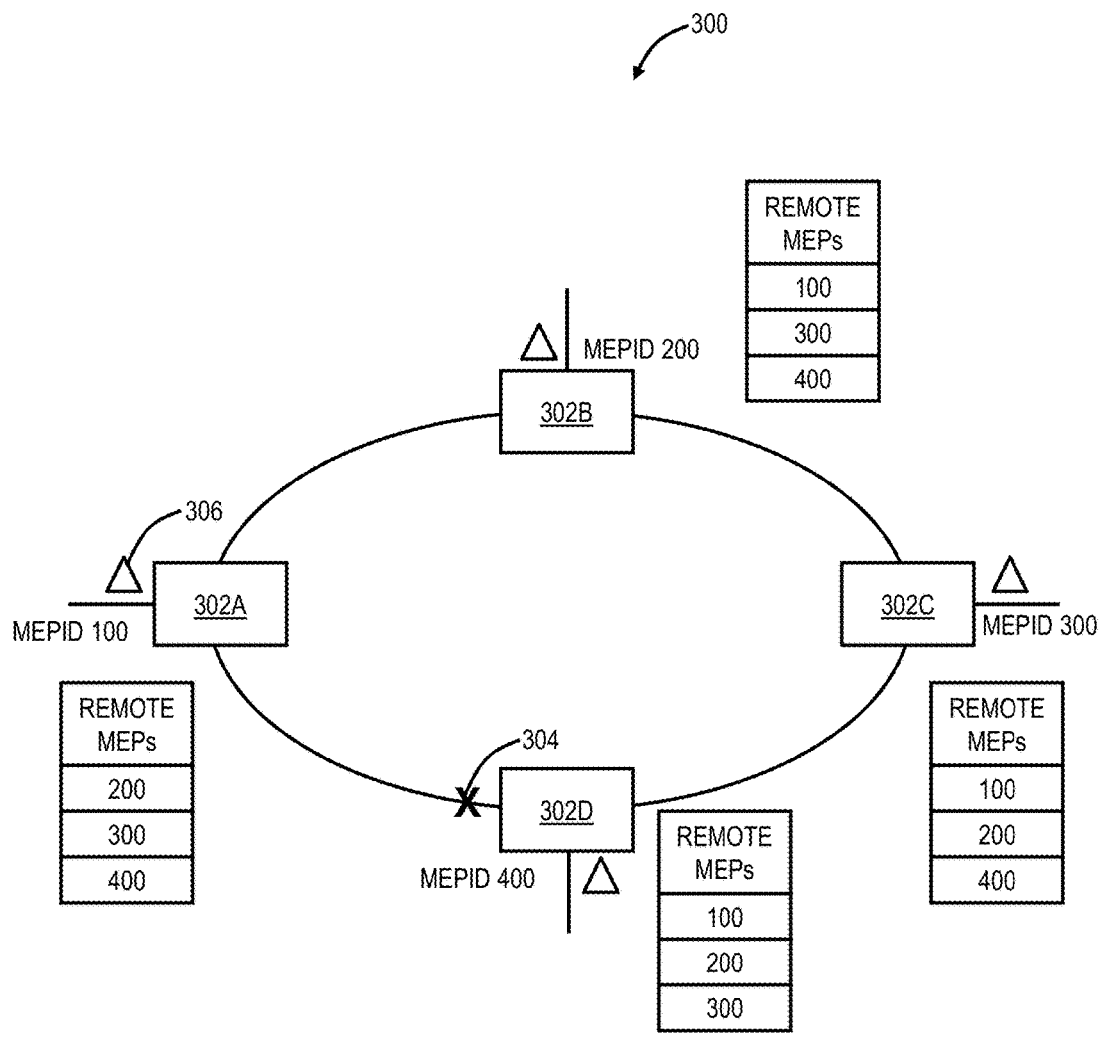
FIG. 3 is a network diagram of an Ethernet network with four nodes.

Referring to FIG. 3, in an embodiment, a network diagram illustrates an Ethernet network 300 with four nodes 302 (labeled as 302A, 302B, 302C, 302D) for CFM over ELAN. The four nodes 302 are connected to one another in a LAN topology, i.e., CFM over ELAN, and in a ring with a blocking port 304 installed on a port of the node 302D (e.g., for G.8032 protection). The network 300 can support various services, e.g., residential, business, mobile backhaul, etc. Since the service resides in a LAN topology, each service instance has a unique MEPID, e.g., MEPIDs 100, 200, 300, 400. The services are monitored by an UP MEP 306 on a service termination port of each node 302. The CFM protocol operation leads to the discovery of remote endpoints (which can be either static or dynamic). Therefore each service instance in an MA is aware of the MEP ID to which it is connected. For example, the node 302A has the UP MEP 306 for the MEPID 100 and discovers remote MEPs 200, 300, 400. FIG. 3 includes tables for each remote MEP discovered at each node 302.

Collectively, the nodes 302 and the MEPIDs 100, 200, 300, 400 are in an MA. It is to be noted that since every endpoint in the MA is aware of the partner remote endpoints, it responds to the fault notifications as and when received from these remote endpoints. For example, a fault associated with any of the individual MEPIDs 100, 200, 300, 400 is propagated to the remaining MEPIDs. As noted herein, this leads to the worst case by default behavior, e.g., a fault on the MEPID 100 may not affect the other MEPIDs, but based on the by default behavior, these services are impacted.

Conditioning Actions on a Client Port

Figure 4:
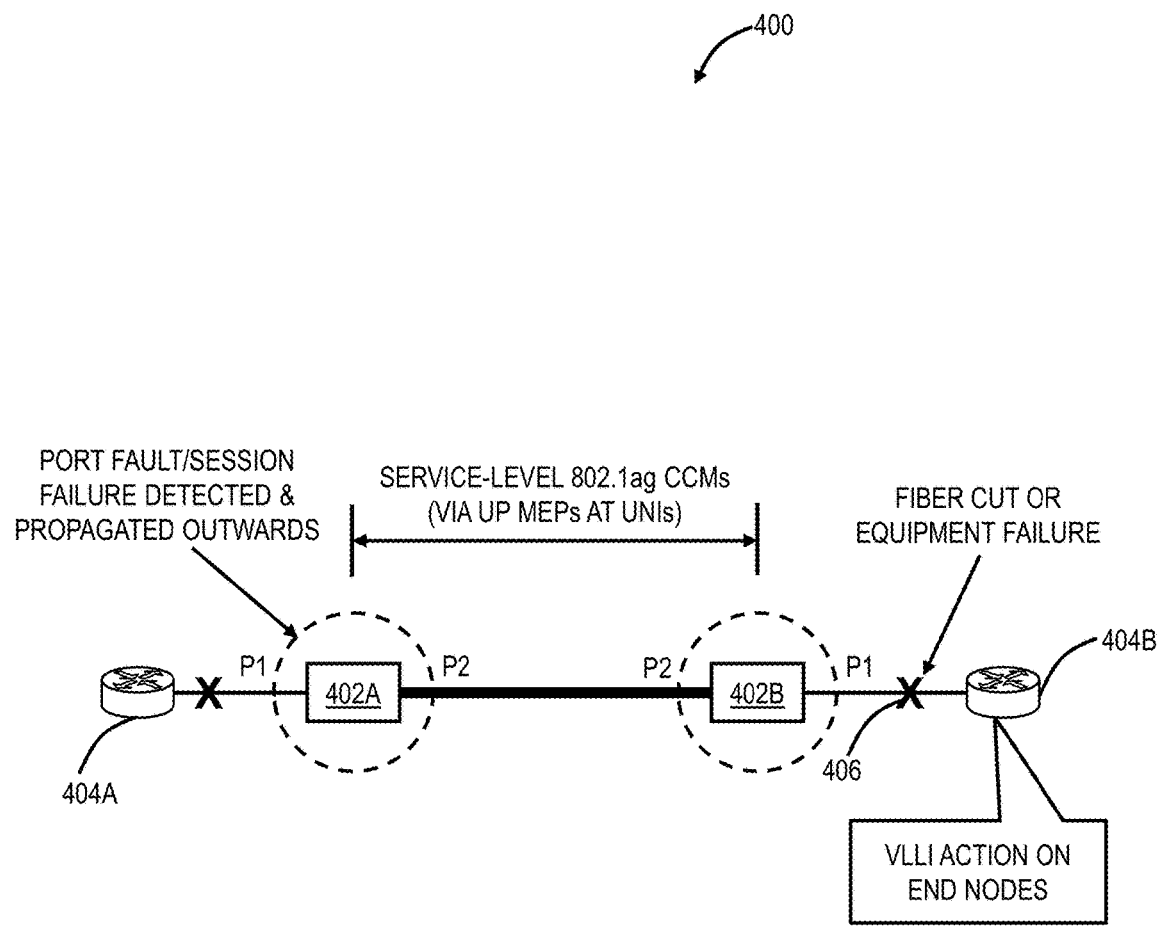
FIG. 4 is a diagram of a network illustrating Virtual Link Loss Indication (VLLI) actions.

Referring to FIG. 4, in an embodiment, a network diagram illustrates a network 400 for Virtual Link Loss Indication (VLLI) actions. IEEE 802.1ag Continuity Check Messages (CCM) provide a mechanism to detect connectivity failures in an MA. It also provides a procedure for encoding variable length PDU (TLV's) in a CCM frame. The "Interface Status" TLV as defined in the standard indicates the status of the interface on which the MEP transmitting the CCM is configured. Several customer applications rely on CCM reported "connectivity failures" or CCM TLV's (e.g., interface TLV) as a mechanism for performing condition action(s) on client ports.

The network 400 includes two nodes 402 (labeled as 402A, 402B) interconnected to one another through ports P2, a Customer Premises Equipment (CPE) 404A connected to the node 402A via port P1, and a CPE 404B connected to the node 402B via port P1. VLLI actions can be configured with an UP MEP service which may get triggered and perform various conditioning action (like port-shut/port-un shut or Local Fault (LF)/Remote Fault (RF) injection) on a client port P1. For example, there are service level IEEE 802.1ag CCMs between the nodes 402A, 402B via UP MEPs at User-Network Interface (UNI) ports. Assume there is a fiber cut or equipment failure 406 between the CPE 404B and the node 402B. VLLI actions can be performed on the end nodes 404 based on the fiber cut or equipment failure 406. Of note, VLLI is conventionally only supported for ELINE services which is a dedicated point-to-point Layer 2 service. The primary reason for this restriction is due to the CCMs being processed at the nodes 402. In CFM over ELAN such as in the network 300, a single MEP learns multiple remote MEPs (versus an ELINE which has one remote MEP) and the associated CCMs from the multiple remote MEPs with different interface/port statuses. These multiple remote MEPs will cause the VLLI states to toggle.

With the systems and methods described herein, VLLI support can be extended to CFM over ELAN topologies. The proposed systems and methods provide flexibility to perform "conditioning" action through the use of "configured priority" on an endpoint. This can ensure that a conditioning action is restricted only to a subset of nodes that conform with the "configured priority" value.

Applications Using Alarm Suppression Procedures

An Alarm Indication Signal (AIS) is used to distinguish between faults at a customer level (between the node 402 and the router 404) or a provider level (between the nodes 402). The AIS is primarily used to suppress provider alarms. Eth-AIS also enables a customer to monitor service availability (and customers can also get compensated depending on service unavailability). In the case where every MEP in a LAN responds to a fault, this could lead to a generation of several AIS messages towards the customer nodes (routers 404) which can potentially be revenue impacting. On the other hand, customers are also impacted as they too bear network outage due to IEEE 802.1ag limitations. The configured priority in the systems and methods proposed herein resolves this limitation, providing benefits to both customers and providers in terms of both revenue and reduced service outage period.

Configured Priority Process

Figure 5:
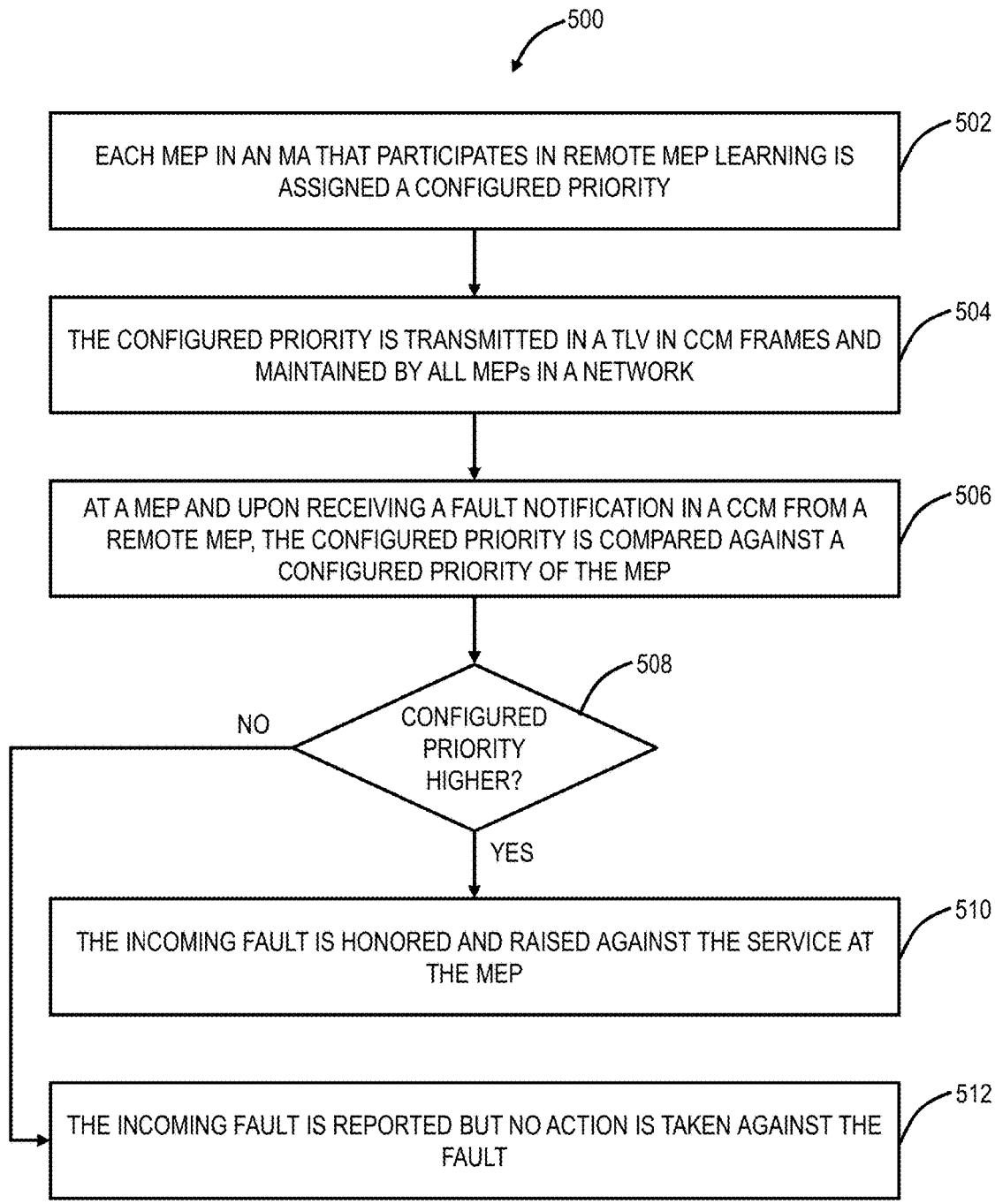
FIG. 5 is a flowchart of a process for configured priority of MEPs in accordance with an embodiment of the proposed solution.

Referring to FIG. 5, in an embodiment, a flowchart illustrates a process 500 for configured priority of MEPs. Specifically, the process 500 addresses the aforementioned network deployment problems related to conditioning actions and alarm suppression. The process 500 contemplates operation in any Ethernet network topology, e.g., ELINE (point-to-point), ELAN (multi-point to multi-point), ETREE (point to multi-point). Each MEP in an MA that participates in remote MEP learning is assigned a configured priority at 502. In an embodiment, the configured priority can be a 16-bit value with a range between 1-65535 with a higher number indicating a higher priority for that MEP. Of course, other embodiments are contemplated.

The configured priority allows different MEPs to cause different actions in the Ethernet network. In an ELINE topology, the configured priority is not critical since there are only two MEPs and it may not be necessary to differentiate. In ELAN and ETREE, there are multiple MEPs, and the configured priority allows differentiation between MEPs to avoid the by default worst case behavior described herein where any MEP causes a fault on all remote MEPs.

The configured priority for each MEP is transmitted at 504 in a TLV in CCM frames from that MEP, and each remote MEP maintains a database of all other MEPs in the network along with associated configured priority. For example, the following table illustrates an example TLV:

| Type = 31 | Length | OUI | Sub-type | Priority (16) |
|---|---|---|---|---|

| TLV fields | Information carried |
|---|---|
| Length | Length of TLV Value |
| OUI | Organizationally Unique Identifier obtainable from IEEE |
| Sub Type | Sub Type shall be implementation specific depending on number of organization specific TLVs encapsulated within CCM frame |
| Priority (16 bit) | Priority of Received CCM |

At an MEP and upon receiving a fault notification in a CCM from a remote MEP, the configured priority is compared at 506 against a configured priority of the receiving MEP. This is performed when a CCM is received with a fault notification, e.g. Remote Defect Indication (RDI), AIS, etc. If the configured priority in the CCM is higher at 508 than the configured priority of the receiving MEP, the incoming fault is honored and raised at 510 against the service at the MEP. If the configured priority in the CCM is not higher at 508 than the configured priority of the receiving MEP, the incoming fault is reported, but no action is taken at 512 against the fault.

With the process 500, other topologies besides ELINE can support VLLI. Specifically, VLLI over ELAN topologies can have conditioning actions that are controlled using a pre-configured and incoming fault CCM indicated priority. In other embodiments, the process 500 can restrict AIS propagation in case the configured priority is greater than incoming fault CCM priority resulting in better alarm suppression and reporting management at customer nodes, e.g., the routers 404.

The configured priority is on a per MEP basis and can be a value in the range of 0-65535. During service turn up, a default priority of 0 can be assigned to each MEP. In case the priority is 0, Organization specific TLVs are not necessarily carried in this CCM PDU. This is required so that if this feature is not used, there is no need configure anything for priority. Depending on topology and deployment of services/MA, an administrator can choose to configure priority other than "0" at the time of creation of each MEP and also update at any time. For example, in an ETREE topology, the MEP at the head end node can be assigned a priority of 32678. Thereafter, the administrator can reassign priorities of leaf nodes to a lower value, e.g., 512. Thereafter, the CCM PDUs are carried with the Organization specific TLV to ensure that fault conditions are handled according to the configured and incoming priority values. The same concept is also applicable for "router-handoff" scenario in an ELAN topology.

Additionally, the following sections describe various deployment scenarios where existing IEEE 802.1ag based networks can use the process 500.

Deployment I—Edge Router Handoff

Figure 6:
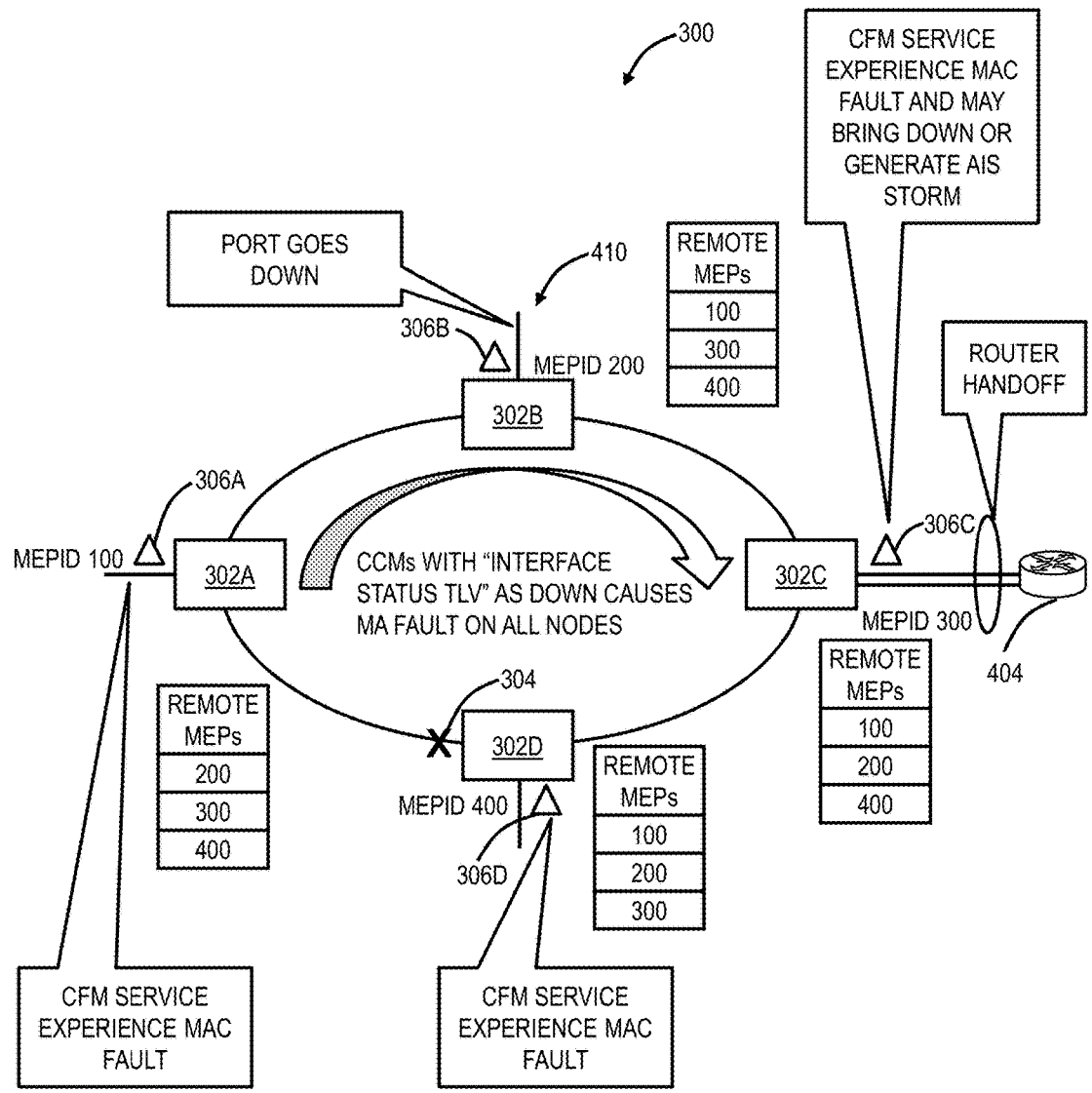
FIG. 6 is a network diagram of the Ethernet network of FIG. 3 for CFM over Ethernet Local Area Network (ELAN) using conventional by default behavior.

In accordance with a deployment FIG. 6 is a network diagram which illustrates the Ethernet network 300 with four nodes 302 (labeled as 302A, 302B, 302C, 302D) for CFM over ELAN using conventional by default behavior. FIG. 6 illustrates a router handoff scenario with a router 404 connected to the node 302C at MEPID 300. There are UP MEPs 306 (labeled as 306A, 306B, 306C, 306D). The Ethernet network 300 is an example of an ELAN topology which is multi-point to multi-point.

Assume there is a fault (CFM service experience MAC fault) between the node 302C and the router 404. In the conventional by default behavior, this may bring down or generate an AIS storm to the other UP MEPs 306A, 306B, 306D. Since this fault is on the UP MEP 306C, it may be desired for port conditioning on the nodes 302A, 302B, 302D. However as per the current IEEE 802.1ag framework, in the case of a port going down on any of the UNI nodes (e.g., a UNI port 410 on the node 302B), the nodes 302 will also experience service fault and may shut down Network-Network Interface (NNI) connections causing complete communication breakdown between several nodes 302, 404 on the LAN and WAN network. Specifically, the UP MEP 302B may transmit CCMs with an Interface Status TLV as down which can cause an MA fault on all of the nodes 302. Thus, with the conventional by default behavior, NNI links (between the nodes 302) can be brought down because of service faults on UNI links (between the node 302 and the router 404).

Using the process 500 in accordance with an embodiment of the proposed solution, the nodes 302 can work at a high priority to mask any faults from MEPs that are working at a lower priority. For example, the UP MEPs 306 can have lower priority since these are facing UNI ports whereas MEPs on the NNI links (e.g., MEPs between the nodes 302A, 302B, etc.) can have higher priority. Thus, when higher priority nodes indicate faults on a CFM service, such as the NNI links, the lower priority UNI links can condition the client side port.

Figure 7:
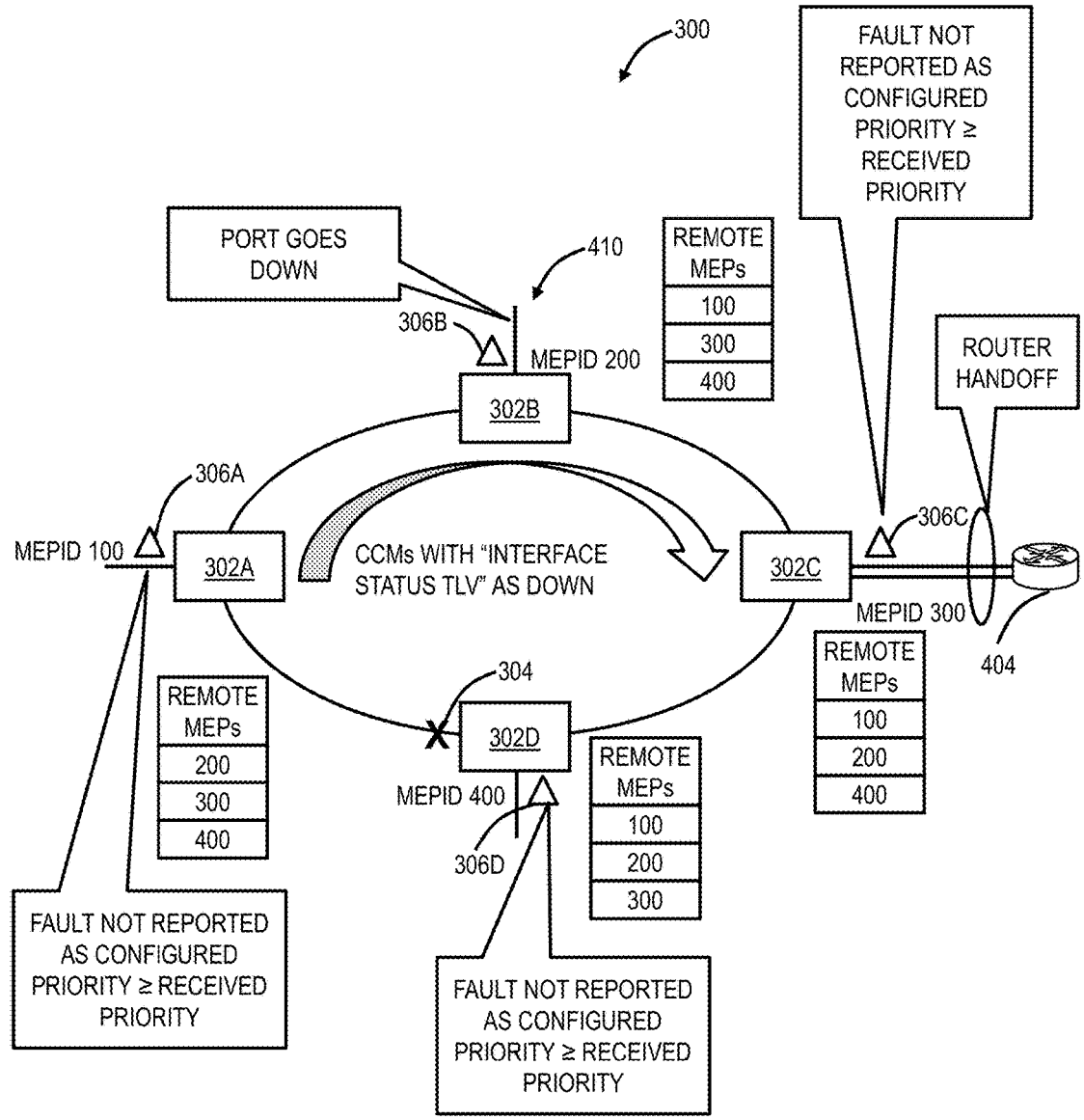
FIG. 7 is a network diagram of the Ethernet network of FIG. 3 for CFM over ELAN using the process of FIG. 5 in accordance with an embodiment of the proposed solution.

Referring to FIG. 7, in an embodiment, a network diagram illustrates the Ethernet network 300 with four nodes 302 (labeled as 302A, 302B, 302C, 302D) for CFM over ELAN using the process 500 in accordance with the proposed solution. FIG. 7 is similar to FIG. 6 but illustrates operation according to the process 500. Here, the port 410 and the UP MEP 306B can have a configured priority referred to as received priority (since it will be received by the other UP MEPs 306A, 306C, 306D). From a terminology perspective, a configured priority is a priority configured at a specific node 302 while a received priority is a priority received in a TLV or the like from another node 302. That is, all nodes 302 can have configured priorities whereas the communication of such priorities is referred to as the received priority. Similar to FIG. 6, the UP MEP 306B will generate CCMs with the interface status TLV as down, but will also include the configured priority TLV in these CCMs with the received priority. All of the UP MEPs 306A, 306C, 306D will receive these CCMs and not report the fault since the configured priority of each of the UP MEPs 306A, 306C, 306D is greater than or equal to the received priority (of the UP MEP 306B). Stated differently, the UP MEPs 306A, 306C, 306D can be edge routers working at the highest priority to mask faults from the UP MEP 306B which is working at a lower priority. Therefore "handoff" connectivity from the nodes 302 is maintained.

Deployment II—ETREE Topologies

Figure 8:
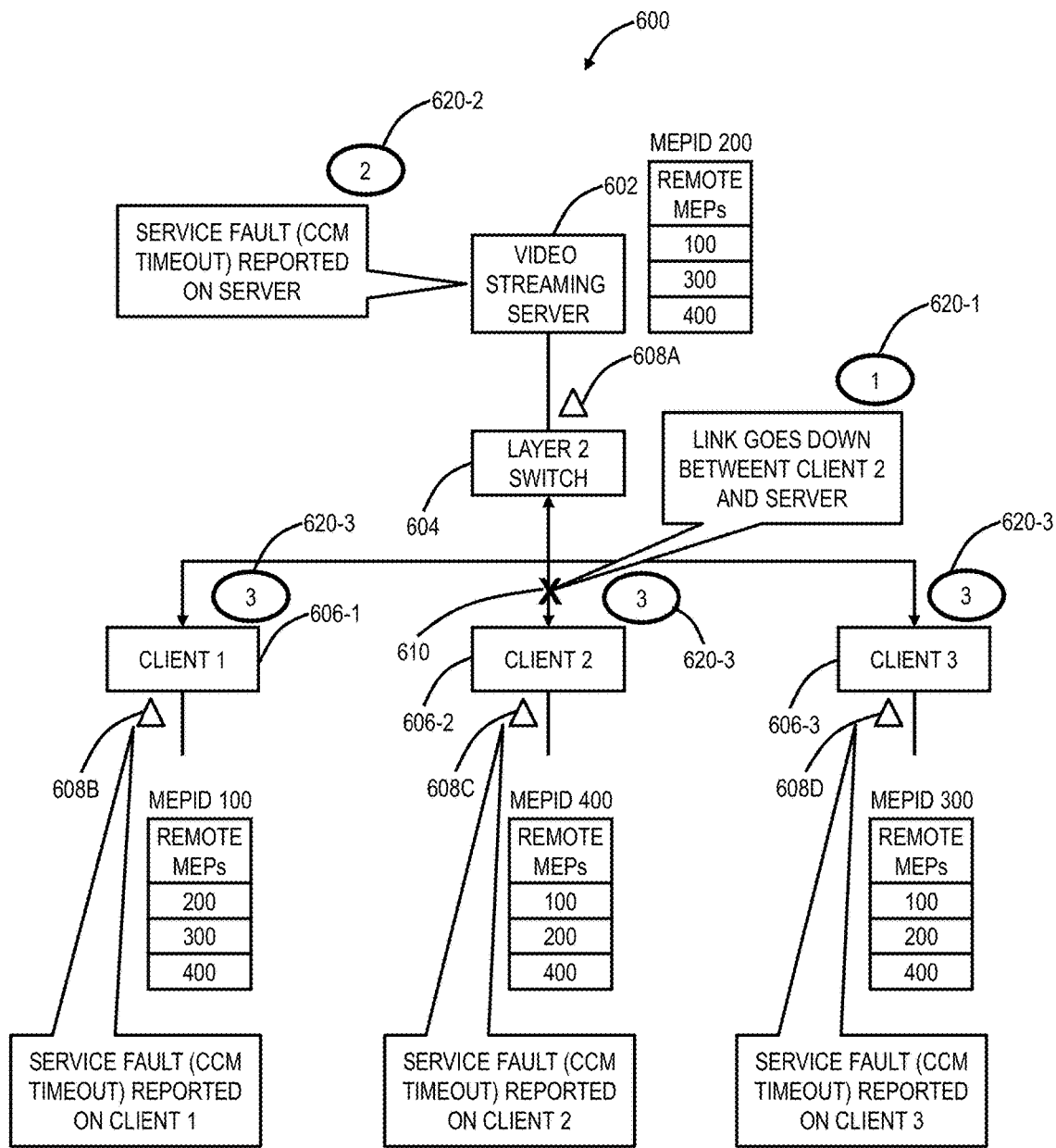
FIG. 8 is a network diagram of an Ethernet network in an Ethernet Tree (ETREE) topology using conventional by default behavior.

In accordance with another deployment FIG. 8 is a network diagram which illustrates an Ethernet network 600 in an Ethernet Tree (ETREE) topology using conventional by default behavior. The ETREE topology is a point to multi-point topology. In this example, the Ethernet network 600 includes a video server 602 distributing content streams via a Layer 2 switch 604 to clients 606-1, 606-2, 606-3. The Ethernet network 600 can include UP MEPs 608 (labeled as 608A, 608B, 608C, 608D) for monitoring. Assume there is a fault 610 on a link between the client 606-2 and the switch 604. In case a service endpoint on any of clients 606 declares a service endpoint fault (because the UNI port goes down or link failure between one of the clients 606 and the switch 604), the other clients 606 and the switch 604 also experience service fault and thereby, inadvertently bring down streaming session connectivity between all other nodes.

For example, the link goes down between the client 606-2 and the server 602 (event 620-1). A service fault is reported on the server 602 due to a CCM timeout from the UP MEP 608C (event 620-2). Service faults are also reported on the clients 606-1, 606-2, 606-3 due to CCM timeout between the various UP MEPs 608 due to the fault 610 (event 620-3).

Figure 9:
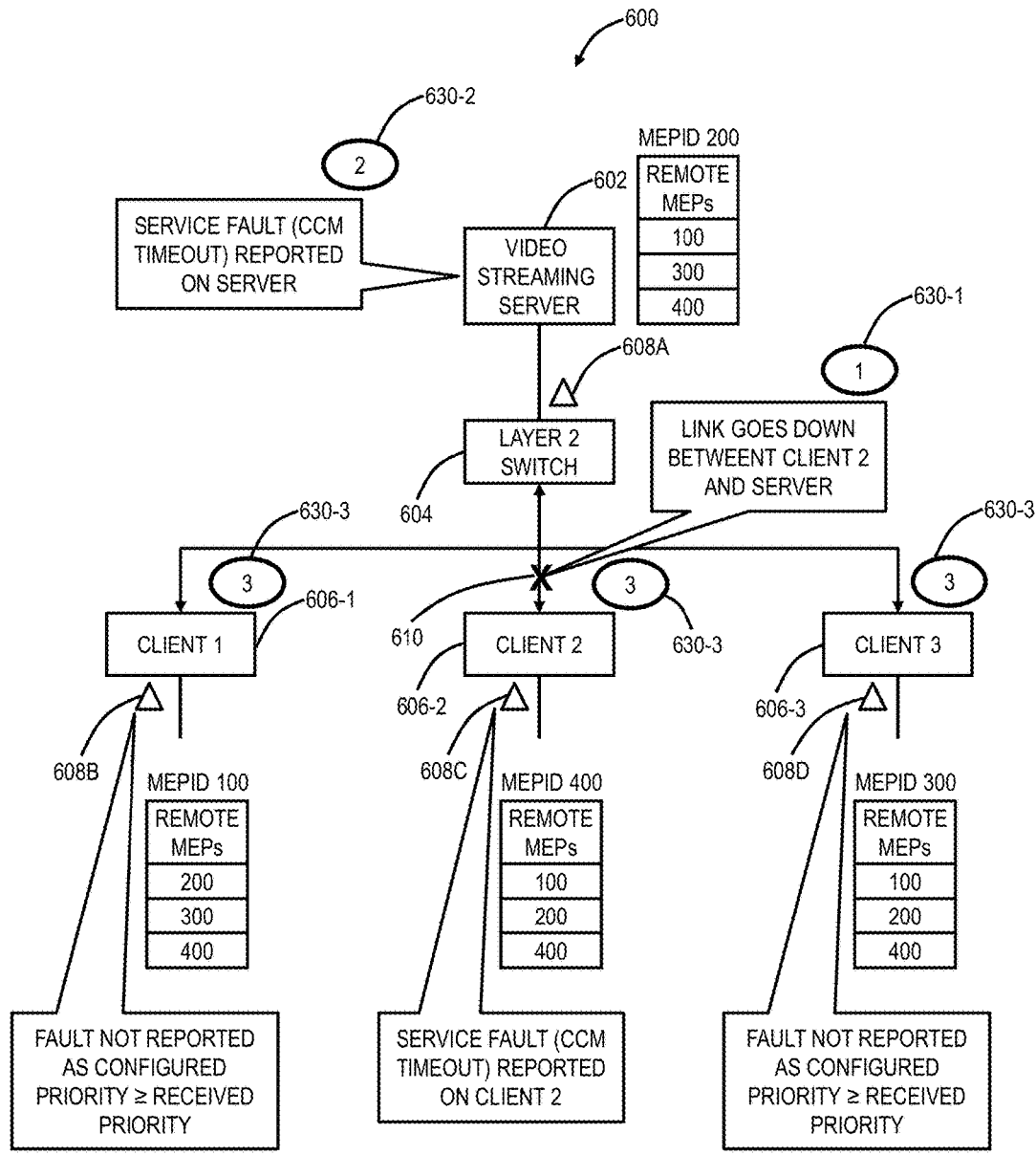
FIG. 9 is a network diagram of the Ethernet network of FIG. 8 using the process of FIG. 5 in accordance with an embodiment of the proposed solution.

Referring to FIG. 9, in an embodiment, a network diagram illustrates the Ethernet network 600 in an Ethernet Tree (ETREE) topology using the process 500 in accordance with the proposed solution. Server 602 can be assigned the highest priority while the clients 606 are assigned a lower priority. In the event of service fault on one of the clients 606, the server 602/switch 604 will not process this fault, and hence connectivity between the server 602/switch 604 and the remaining clients 606 will not be broken/lost. Since the server 602/switch 604 is at the highest priority, it masks faults from maintenance endpoints working at a lower priority, i.e., the clients 606. Therefore, service continuity therebetween is maintained even if one of the lower priority MEPs goes down.

State Machine

Figure 10:
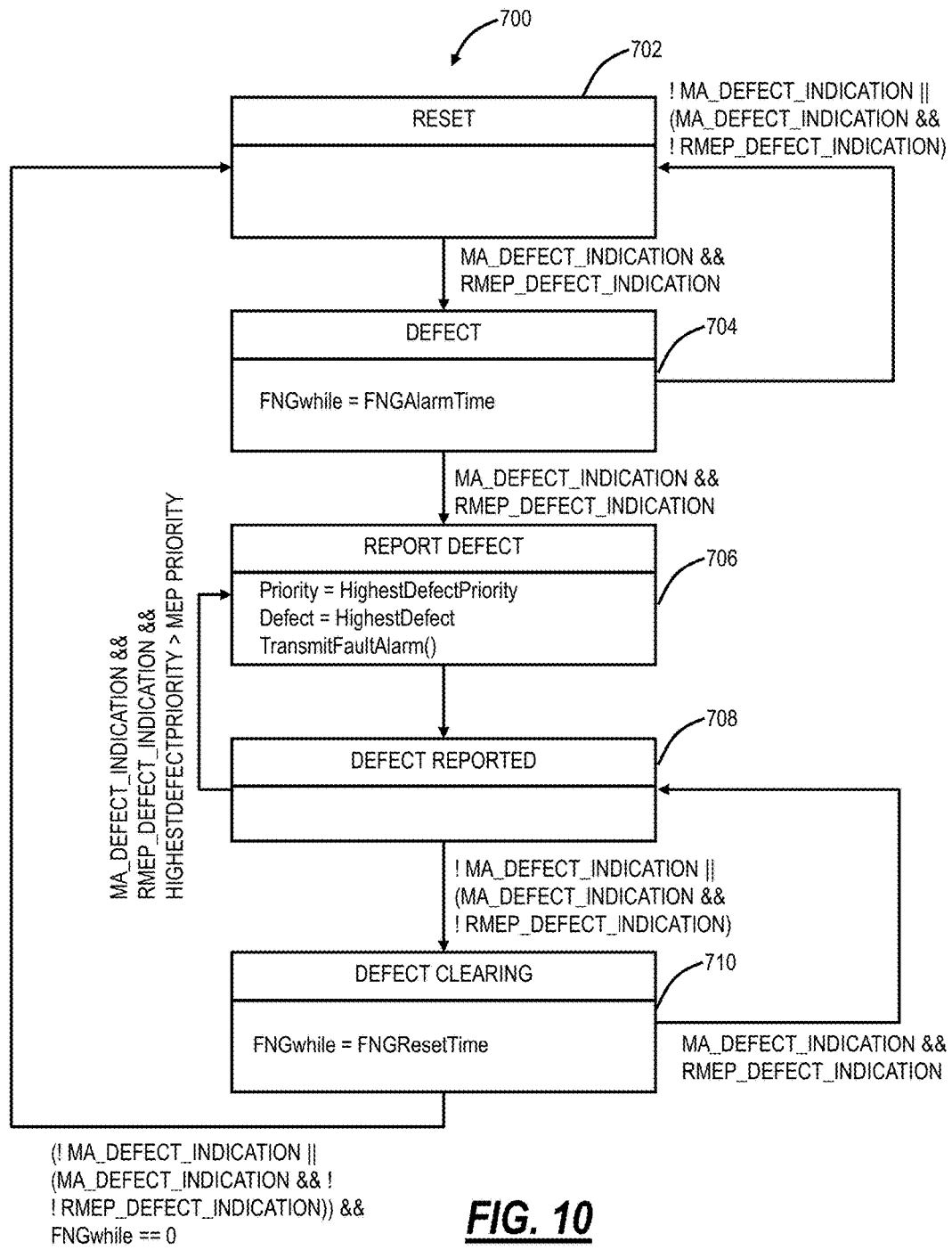
FIG. 10 is a diagram of a state machine for IEEE 802.1ag fault notification generation based on variable priority in accordance with an embodiment of the proposed solution.

For clarity, IEEE 802.1ag does not describe any mechanism to prioritize between defects reported from different remote MEPs. Conventionally, any remote MEP defect whose priority is greater than equal to a variable "lowestAlarmPri" can trigger fault alarm irrespective of the remote MEP which has reported this defect. The systems and methods address this problem by triggering fault alarm generation only when the reporting remote MEP priority is greater than the configured MEP priority on a node. Referring to FIG. 10, in an embodiment of the proposed solution, a diagram illustrates a state machine 700 for IEEE 802.1ag fault notification generation based on variable priority. The state machine 700 includes a reset state 702, a defect state 704, a report defect state 706, a defect reported state 708, and a defect clearing state 710

The following variables are used with the state machine 700:

| Variable | Description |
| --- | --- |
| MEP Priority | Variable indicating priority of the MEP configured in an MA. This variable is configurable by admin (customer/user). |
| Remote MEP Priority | Variable indicating priority of the remote MEP configured in an MA. The value of this variable should be equal to the value of priority for corresponding MEP (i.e., remote MEP) on another node. |
| MA_DEFECT_INDICATION | A Boolean value (True or False) indicating the presence of a defect in the MA. |
| RMEP_DEFECT_INDICATION | A Boolean indicating the aggregate state of the remote MEP state machines. "True" indicates that at least one of the remote MEP state machine configured on an MEP whose RMEP Priority is greater than the MEP Priority is reporting defect (RDI defect, RMEP CCM defect, MAC status Defect, error CCM defect or cross-connect "xcon" CCM defect), and false indicates that none of the Remote MEP state machines configured on an MEP whose priority is greater than MEP Priority is reporting a defect. RMEP_DEFECT_INDICATION will always be false whenever MA_DEFECT_INDICATION is false. |
| FNGwhile (Fault Notification Generation) while | A timer used in the defect state 704 to determine how long to report the defect and in the defect clearing state 710 to determine when to clear the defect. |
| FNGAlarmTime | A time for using the FNGwhile timer to report the defect. |
| Defect | A defect such as an RDI defect, RMEP CCM defect, MAC status Defect, error CCM defect or xcon CCM defect. |
| FNGResetTime | A guard time for determining clearing the defect. |

The variables common to the IEEE 802.1ag state machines have the same meaning.

The state machine 700 can be implemented (as gate logic or coded logic) at each node in an Ethernet topology supporting the systems and methods proposed herein. For Boolean operations in FIG. 10, "!" means NOT, "&&" means AND, and "||" means OR. The reset state 702 is the default state operating without a defect in the network. A defect occurs when both MA_DEFECT_INDICATION and RMEP_DEFECT_INDICATION are TRUE and the state machine 700 transitions to the defect state 704. The FNGwhile timer is run for the FNGAlarmTime to ensure the defect remains and during this time if this is TRUE—! MA_DEFECT_INDICATION||(MA_DEFECT_INDICATION && ! RMEP_DEFECT_INDICATION), the state machine 700 transitions back to the reset state 702, i.e., the MA_DEFECT_INDICATION has cleared OR the MA_DEFECT_INDICATION remains (local) and there are no RMEP_DEFECT_INDICATION.

Otherwise, the state machine 700 transitions to the report defect state 704 after the FNGwhile timer. In the report defect state 704, the state machine 700 determines the priority as the highest defect priority received and the defect is the highest defect received, and the node operating the state machine 700 transmits a fault alarm. Here, the node reports its defect to other RMEPs and the state machine 700 transitions to the defect reported state 708. From the defect reported state 708, the state machine 700 transitions back to the report defect state 704 if MA_DEFECT_INDICATION && RMEP_DEFECT_INDICATION && HIGHESTDEFECTPRIORITY>MEP PRIORITY. Otherwise, the state machine 700 remains in the defect reported state 708 without further alarm transmissions because the defect priority is less than or equal to the MEP priority of the node.

The state machine 700 transitions to the defect clearing state 710 when ! MA_DEFECT_INDICATION||(MA_DEFECT_INDICATION && ! RMEP_DEFECT_INDICATION). The defect clearing state 710 includes a guard timer FNGwhile=FNGResetTime and if MA_DEFECT_INDICATION && RMEP_DEFECT_INDICATION occurs, the state machine 700 transitions back to the defect reported state 708. If (! MA_DEFECT_INDICATION||(MA_DEFECT_INDICATION && ! ! RMEP_DEFECT_INDICATION)) && FNGwhile==0, the state machine 700 transitions back to the reset state 702.

In accordance with the proposed solution the state machine 700 is a modification of the existing IEEE 802.1ag state machines with differences to account for priority and alarm reporting suppression.

Multiple Levels of Hierarchy

Figure 11:
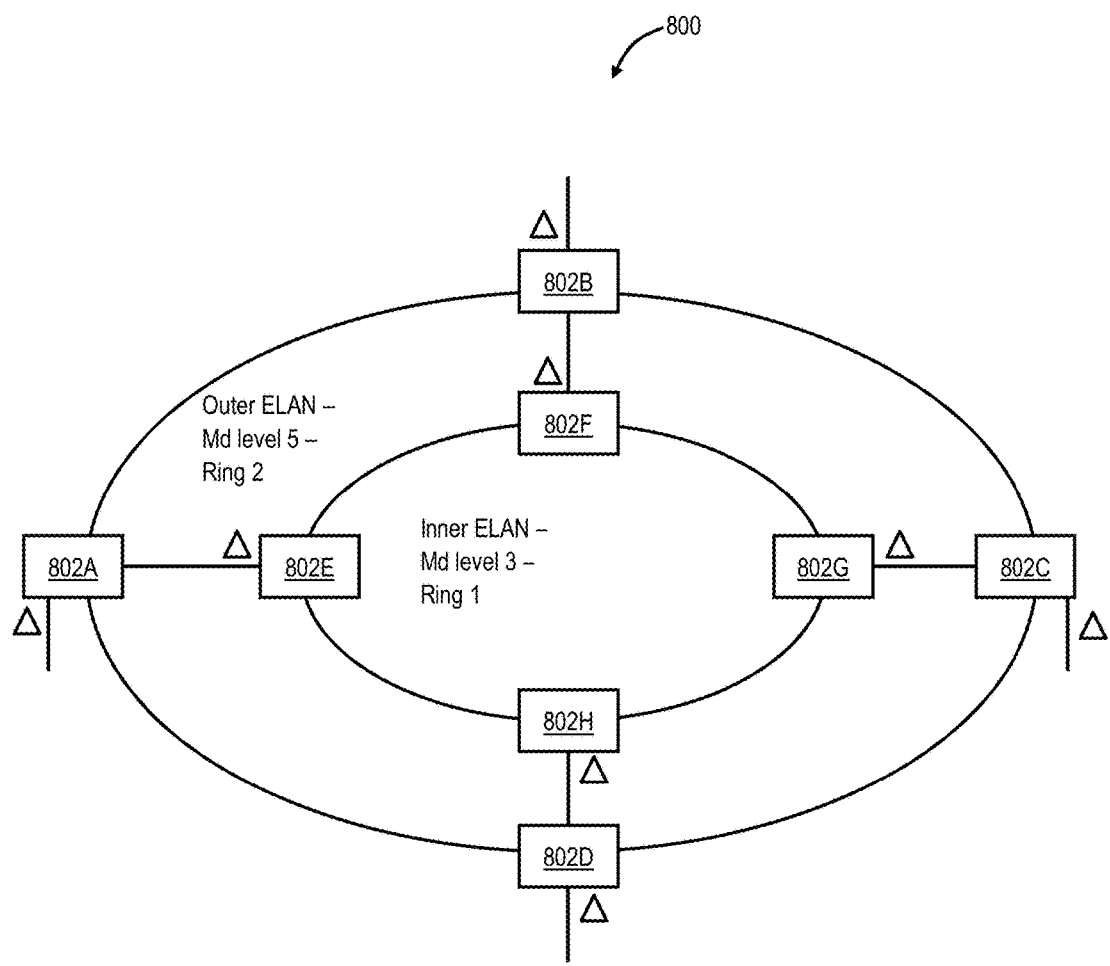
FIG. 11 is a network diagram of an Ethernet network with multiple levels of hierarchy employing the process in accordance with an embodiment of the proposed solution.

FIG. 11, in accordance with an embodiment of the proposed solution, is a network diagram illustrating an Ethernet network 800 with multiple levels of hierarchy employing process 500. Specifically, there are two interconnected rings with nodes 802 (labeled as 802A-802H). The nodes 802A-802D are in an outer ring working at MD-level 5 and the nodes 802E-802H are in an inner ring working at MD-level 3. Per the process 500 and the state machine 700, the MEPs associated with the nodes 802 will all have their priority. In case there is a frame leakage across domains, an "XC" error on the MA can prevent any unpredictable and indeterminate behavior.

Multiple Simultaneous Faults

With respect to how the priority scheme would work in ELAN and ETREE topologies where there are multiple simultaneous faults, for example, in the table below a node has been configured with priority −5. It is has received CCMs from remote MEPs with different kind of faults (CCM-timeout (RM) & CCM-time interval mismatch (CC)) with different priorities.

| MEP ID (User configured priority –5) | Remote MEP ID |
|---|---|
| 100 | 200-(priority-7)-Fault-RM |
|  | 300-(priority-3)-fault-CC |

Per the systems and methods described herein, the same will be handled gracefully at the node with the fault from remote MEPID 200 taking precedence over the other remote MEPID.

Process of Prioritizing CFM Conditioning Actions

Figure 12:
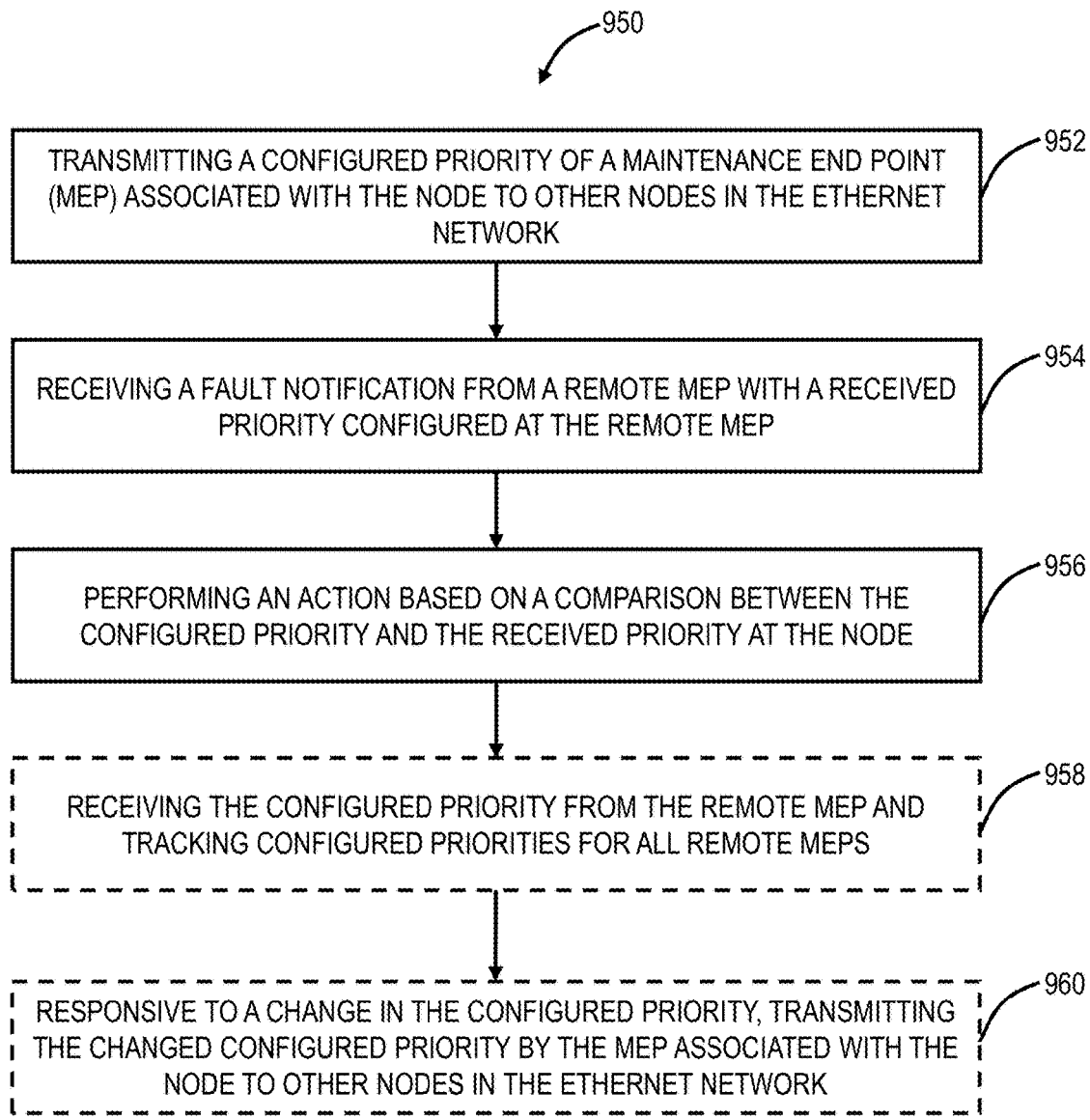
FIG. 12 is a flowchart of a process of prioritizing Connectivity Fault Management (CFM) conditioning actions in a node in an Ethernet network.

Referring to FIG. 12, in an exemplary embodiment, a flowchart illustrates a process 950 of prioritizing Connectivity Fault Management (CFM) conditioning actions in a node in an Ethernet network. The process 950 includes transmitting a configured priority of a Maintenance End Point (MEP) associated with the node to other nodes in the Ethernet network (step 952); receiving a fault notification from a remote MEP with a received priority configured at the remote MEP (step 954); and performing an action based on a comparison between the configured priority and the received priority at the node (step 956). The process 950 can further include receiving the configured priority from the remote MEP and tracking configured priorities for all remote MEPs (step 958). The process 950 can further include, responsive to a change in the configured priority, transmitting the changed configured priority by the MEP associated with the node to other nodes in the Ethernet network (step 960).

The configured priority can be zero during service turn up by the node, and wherein the configured priority can be updated by an administrator and the transmitting occurs subsequent to the configured priority being updated to a non-zero value. The transmitting the configured priority can be via a Type-Length-Value (TLV) in a Continuity Check Message (CCM). The performing can include, responsive to the received priority being higher than the configured priority, raising a fault associated with the fault notification against a service associated with the MEP; and. responsive to the received priority being less than or equal to the configured priority, ignoring the fault against the service.

The Ethernet network can include an Ethernet Local Area Network (ELAN) topology which is multi-point to multi-point. The Ethernet network can include an Ethernet Tree (ETREE) topology which is point to multi-point with a head node including an MEP with a highest priority. The Ethernet network can include at least two remote MEPs, each with a different configured priority, and wherein the Ethernet network utilizes CFM between the node and the at least two remote MEPs. The Ethernet network can include at least one remote MEP in a point-to-point topology, each of the node and the at least one remote MEP with a different configured priority, and wherein the Ethernet network utilizes CFM between the node and the at least one remote MEP.

In another exemplary embodiment, an apparatus configured to prioritize Connectivity Fault Management (CFM) conditioning actions at a node in an Ethernet network includes circuitry configured to transmit a configured priority of a Maintenance End Point (MEP) associated with the node to other nodes in the Ethernet network; circuitry configured to receive a fault notification from a remote MEP with a received priority; and circuitry configured to perform an action based on a comparison between the configured priority and the received priority at the node.

In a further exemplary embodiment, a node in an Ethernet network configured to prioritize Connectivity Fault Management (CFM) conditioning actions includes one or more ports; and a controller communicatively coupled to the one or more ports and configured to transmit a configured priority of a Maintenance End Point (MEP) associated with the node to other nodes in the Ethernet network, receive a fault notification from a remote MEP with a received priority, and perform an action based on a comparison between the configured priority and the received priority at the node.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of prioritizing Connectivity Fault Management (CFM) conditioning actions in a node in an Ethernet network, the method comprising:

transmitting, in a Continuity Check Message (CCM), a configured priority of a Maintenance End Point (MEP) associated with the node to other nodes in the Ethernet network, wherein the configured priority is transmitted in addition to transmitting a Maintenance Entity Group (MEG) level in the CCM;

receiving a fault notification from a remote MEP with a received priority configured at the remote MEP; and performing an action based on a comparison between the configured priority and the received priority at the node such that the action is performed if the received priority is greater than the configured priority.

2. The method of claim 1, further comprising:
receiving the configured priority from the remote MEP and tracking configured priorities for all remote MEPs.

3. The method of claim 1, further comprising:
responsive to a change in the configured priority, transmitting the changed configured priority by the MEP associated with the node to other nodes in the Ethernet network.

4. The method of claim 1, wherein the configured priority is zero during service turn up by the node, and wherein the configured priority is updated by an administrator and the transmitting occurs subsequent to the configured priority being updated.

5. The method of claim 1, wherein the transmitting the configured priority is via a Type-Length-Value (TLV) in the CCM.

6. The method of claim 1, wherein the performing comprises:
responsive to the received priority being higher than the configured priority in a fault reporting message, raising a fault associated with the fault notification against a service associated with the MEP; and
responsive to the received priority in a fault reporting message being less than or equal to the configured priority, ignoring the fault against the service.

7. The method of claim 1, wherein the Ethernet network comprises an Ethernet Local Area Network (ELAN) topology which is multi-point to multi-point having nodes with different configured priorities.

8. The method of claim 1, wherein the Ethernet network comprises an Ethernet Tree (ETREE) topology which is point to multi-point with a head node comprising an MEP with a highest priority different from client nodes.

9. The method of claim 1, wherein the Ethernet network comprises at least two remote MEPs, each with a different configured priority, and wherein the Ethernet network utilizes CFM between the node and the at least two remote MEPs.

10. The method of claim 1, wherein the Ethernet network comprises at least one remote MEP in a point-to-point topology, each of the node and the at least one remote MEP with a different configured priority, and wherein the Ethernet network utilizes CFM between the node and the at least one remote MEP.

11. An apparatus configured to prioritize Connectivity Fault Management (CFM) conditioning actions at a node in an Ethernet network, the apparatus comprising:
circuitry configured to transmit, in a Continuity Check Message (CCM), a configured priority of a Maintenance End Point (MEP) associated with the node to other nodes in the Ethernet network, wherein the configured priority is transmitted in addition to transmitting a Maintenance Entity Group (MEG) level in the CCM;
circuitry configured to receive a fault notification from a remote MEP with a received priority; and
circuitry configured to perform an action based on a comparison between the configured priority and the received priority at the node such that the action is performed if the received priority is greater than the configured priority.

12. The apparatus of claim 11, further comprising:
circuitry configured to receive the received priority from the remote MEP and track configured priorities for all remote MEPs.

13. The apparatus of claim 11, wherein the configured priority is transmitted via a Type-Length-Value (TLV) in the CCM.

14. The apparatus of claim 11, wherein the circuitry configured to perform is configured to:
responsive to the received priority being higher than the configured priority, raise a fault associated with the fault notification against a service associated with the MEP; and
responsive to the received priority being less than or equal to the configured priority, ignore the fault against the service.

15. The apparatus of claim 11, wherein the Ethernet network comprises an Ethernet Local Area Network (ELAN) topology which is multi-point to multi-point having nodes with different configured priorities.

16. The apparatus of claim 11, wherein the Ethernet network comprises an Ethernet Tree (ETREE) topology which is a point to multi-point with a head node comprising an MEP with a highest priority different from client nodes.

17. The apparatus of claim 11, wherein the Ethernet network comprises at least two remote MEPs, each with a different configured priority, and wherein the Ethernet network utilizes CFM between the node and the at least two remote MEPs.

18. The apparatus of claim 11, wherein the Ethernet network comprises at least one remote MEP in a point-to-point topology, each of the node and the at least one remote MEP with a different configured priority, and wherein the Ethernet network utilizes CFM between the node and the at least one remote MEP.

19. A node in an Ethernet network configured to prioritize Connectivity Fault Management (CFM) conditioning actions, the apparatus node:
one or more ports; and
a controller communicatively coupled to the one or more ports and configured to
transmit, in a Continuity Check Message (CCM), a configured priority of a Maintenance End Point (MEP) associated with the node to other nodes in the Ethernet network, wherein the configured priority is transmitted in addition to transmission of a Maintenance Entity Group (MEG) level in the CCM,
receive a fault notification from a remote MEP with a received priority, and
perform an action based on a comparison between the configured priority and the received priority at the node such that the action is performed if the received priority is greater than the configured priority.

20. The node of claim 19, wherein the controller is further configured to
receive the received priority from the remote MEP and track configured priorities for all remote MEPs.

* * * * *